US005297771A

United States Patent [19]

Gilbert

[11] Patent Number: 5,297,771

[45] Date of Patent: Mar. 29, 1994

[54] SUPPORT ASSEMBLY FOR STANDING MUSICAL INSTRUMENTS

[76] Inventor: Mark Gilbert, 8320 Pine Cross La., Ann Arbor, Mich. 48103

[21] Appl. No.: 988,979

[22] Filed: Dec. 10, 1992

[51] Int. Cl.[5] ..... F16M 3/00

[52] U.S. Cl. ..... 248/688; 84/327; 248/443

[58] Field of Search ..... 248/688, 689, 676, 443; 84/280 R, 280 C, 327, 421

[56] References Cited

U.S. PATENT DOCUMENTS

| | | | |
|---|---|---|---|
| 1,288,179 | 12/1918 | Poehland | 84/280 |
| 2,974,556 | 3/1961 | Fawick | 84/280 |
| 3,866,877 | 2/1975 | Thompson | 248/688 |
| 4,586,418 | 5/1986 | Stahlhammer | 84/280 |
| 5,003,858 | 4/1991 | Rowell | 84/280 |
| 5,069,102 | 12/1991 | Wolf | 84/280 |
| 5,149,905 | 9/1992 | Count | 84/327 X |
| 5,202,527 | 4/1993 | Gracie | 84/327 |

*Primary Examiner*—Ramon O. Ramirez

*Attorney, Agent, or Firm*—Katherine McGuire

[57] ABSTRACT

The present invention provides a standing instrument support assembly having selectively adjustable elements which substantially reduce the amount of force a musician must exert to support and balance the instrument while playing. The support assembly generally has three basic, interlocking elements which are: 1) an elongated, rigid crossbar having a clamp integrally extending from one end thereof; 2) an elongated endpin holder which pivotally and slidably connects within a longitudinally extending slot formed in the crossbar via a laterally extending screw; and 3) an elongated, rigid endpin which telescopically and slidably engages within a longitudinally extending bore in the end of the endpin holder opposite the end which engages the crossbar. The three elements may be positioned such that the endpin engages the floor at the position which is coincident with the line of action caused by the weight vector) which thereby substantially eliminates the tilting moment caused by the weight of the instrument.

10 Claims, 2 Drawing Sheets

FIG.4
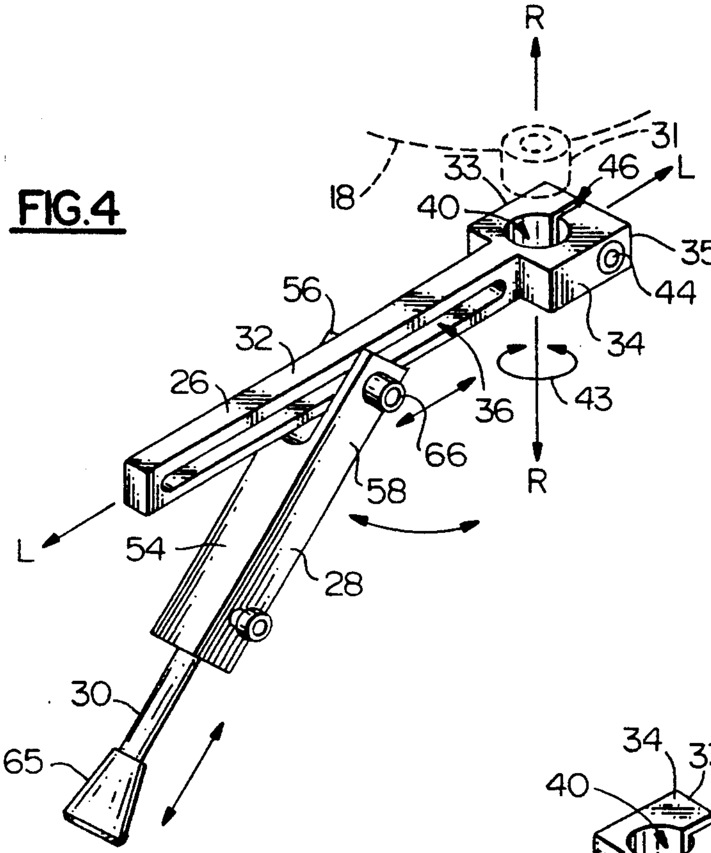
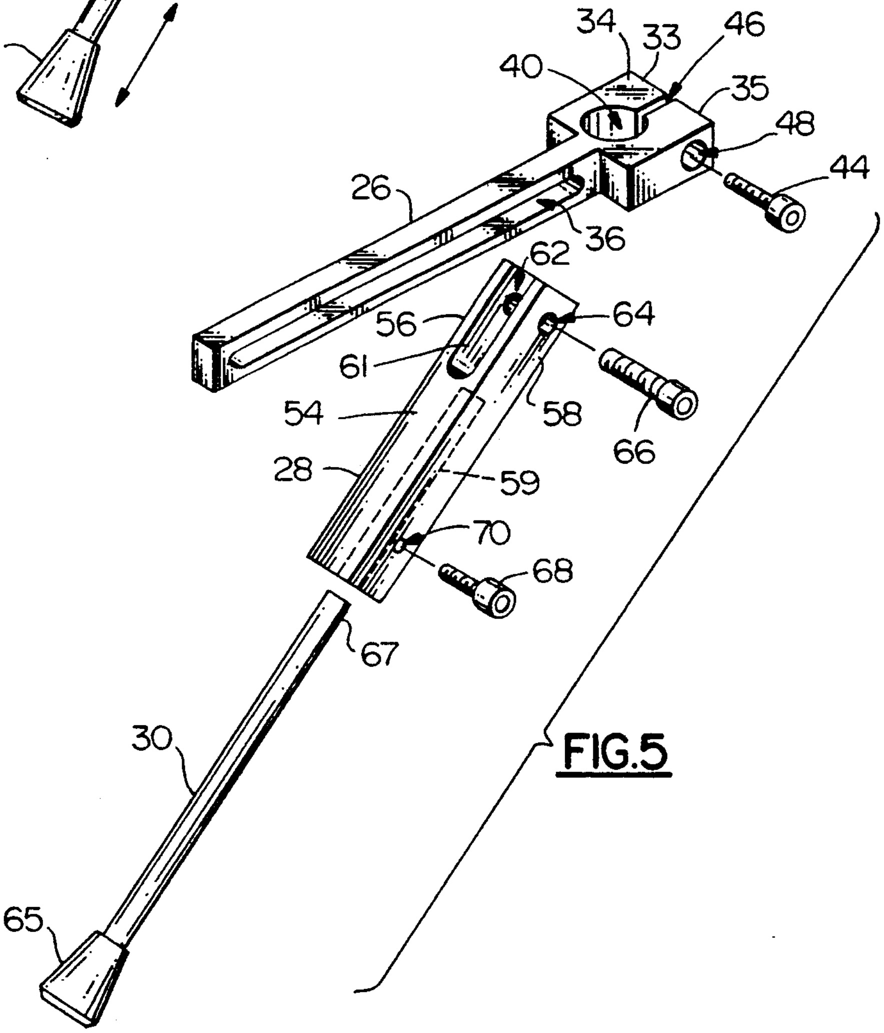
FIG.5

SUPPORT ASSEMBLY FOR STANDING MUSICAL INSTRUMENTS

BACKGROUND OF THE INVENTION

The present invention relates to means for supporting stringed instruments of the floor standing type such as a bass violin, for example, as they are played by standing musicians, and more particularly to a selectively adjustable support assembly which substantially eliminates the tilting moment caused by the weight of the instrument. The support assembly thus provides the musician with an instrument which is much less strenuous to handle.

The facility with which a musician may play a relatively large, standing musical instrument such as a bass violin, for example, tends to vary with a variety of circumstances. A right-handed player, for instance, typically operates a bow or plucks strings with his right hand, and slidingly positions the left hand on the neck of the instrument to appropriately finger the strings. In addition to fingering the strings, the left hand (and shoulder if playing in the high register) also needs to support and balance the instrument, thus requiring additional effort and concentration on the part of the musician. How much effort and concentration is needed, of course, depends upon, among other things, the physical proportions of the musician, the dimensions of the instrument, and the musician's playing technique.

Musicians playing in a standing position usually find it necessary to tilt the instrument a certain amount away from the vertical in order to reach the strings easier. When this is done, an instrument which includes a conventional, elongated endpin extending downwardly from a knob on the bottom surface of the instrument body tends to slip away from the musician due to the tilting moment created by the offset center of gravity (referred to hereinafter as CG) and the low coefficient of friction inherent in the material which composes the endpin. This requires the musician to support and balance the instrument with a force which will provide an equal and opposite moment to counteract the force produced by the tilting.

To remedy the problem of the instrument sliding away from the musician, non-slip materials have been used on the tip of the endpins. This cures the slipping of the instrument, but the large tilting moment still exists due to the offset CG.

A bent endpin has been used in the past in an attempt to remedy the problem of the offset CG. The bent endpin design positions the point at which the endpin engages the floor back towards the line of action which runs through the CG along the weight force vector of the instrument (i.e., the line of action which, in this case, is the line which extends perpendicularly upwards from the floor, through the CG). Depending on the amount of tilt of the instrument, the bent endpin reduces the tilting moment of the instrument accordingly, thus lessening the force required by the musician to counteract the moment.

A major disadvantage of the bent endpin design is that the endpin provides support which substantially eliminates the tilting moment of the instrument at only one particular tilt angle. This severely limits any experimentation a musician may perform to perfect his playing technique. In addition, if a musician plays a variety of instruments, it would be necessary to buy a separate support member for each instrument. Furthermore, this endpin construction flexes fairly easily, especially for musicians who are short, and/or have a tall instrument. This induces a "pogo-stick" type bouncing of the instrument which requires the musician to further increase his/her control and support of the instrument.

SUMMARY OF THE INVENTION

It is therefore a principal object of the present invention to provide a support assembly for a standing musical instrument which will balance the instrument such that substantially no force is required from the musician's fingering hand and/or shoulder to counteract the tilting moment created when the instrument is played at one tilt angle within a wide range of tilt angles.

It is another object of the invention to provide a rigid support assembly for a standing musical instrument, thus avoiding any bounce in the instrument as it is being played.

It is yet a further object of the invention to provide a musical instrument support assembly which will stabilize the instrument as it is being played.

It is yet another object of the invention to provide a musical instrument support assembly which is selectively adjustable thus allowing a musician to experiment within a wide range of instrument playing angles.

It is still a further object of the invention to provide a musical instrument support assembly which accommodates musicians of different heights, girths and arm lengths.

It is still another object of the present invention to provide a standing musical instrument support assembly which removably attaches to any large stringed instrument with no modification of the instruments or the support assembly being required.

Other objects will in part be obvious and in part appear hereinafter.

In accordance with the foregoing objects, the present invention provides a standing musical instrument support assembly having selectively adjustable elements which substantially reduces the amount of force a musician must exert to support and balance the instrument while playing. The support assembly generally comprises three basic, interlocking elements which are: 1) an elongated, rigid crossbar having a clamp integrally extending from one end thereof; 2) an elongated endpin holder which pivotally and slidably connects within a longitudinally extending slot in the crossbar via a laterally extending screw; and 3) an elongated, rigid endpin which telescopically and slidably engages within a longitudinally extending bore in the end of the endpin holder opposite the end which engages the crossbar.

More particularly, the clamp portion of the crossbar is of the circumferential type and removably mounts the crossbar to a knob which is mounted to the center, bottom portion of the instrument body. The shaft portion of the elongated crossbar extends from the clamp portion in a direction outwardly and away from the instrument body and substantially perpendicular to the central, longitudinal axis of the instrument. The crossbar shaft includes a longitudinally extending slot whose radial axis lies perpendicular to the radial axis extending through the circumferential clamp. Although a circumferential clamp is shown and described herein, any other suitable clamp could be utilized, e.g., a dual V-block clamp, a single V-block with band type clamp, etc. A single V-block with band type clamp provides a somewhat greater range of diameter adjustment than the circumferential clamp and may therefore be preferred from a marketing standpoint.

The endpin holder comprises an elongated, rigid member having a longitudinally extending bore at one end thereof, and first and second prongs integrally extending in parallel, spaced relation from the other end thereof. First and second, laterally aligned apertures are formed in the first and second prongs, respectively, wherethrough a locking screw extends to pivotally and slidingly attach the endpin holder to the crossbar through the slot with the prongs placed in straddling relationship to the crossbar shaft.

The endpin holder further includes a longitudinally extending bore in the end opposite the prongs, with the bore extending to the bottom of the wall of the channel between the prongs. An aperture is formed through the endpin holder to the bore, adjacent the end opposite the prongs, to allow a set screw to be inserted therethrough which adjustably secures the endpin telescopically within the bore of the endpin holder.

The endpin of the support assembly is of conventional, elongated design, including a rubber stopper at the end thereof opposite the endpin holder to help prevent any slippage of the instrument on the floor as it is being played.

The support assembly, when properly positioned, substantially eliminates the need for the musician to produce a force to help support and balance the instrument. Furthermore, if the musician desires to experiment with various playing techniques, the support assembly can be repositioned such that the tilting moment of the instrument due to its weight is always substantially zero. In addition, the support assembly can be used on a variety of standing musical instruments and always achieve its objectives.

BRIEF DESCRIPTION OF THE DRAWINGS

FIG. 4 is a perspective view of the support assembly with directional arrows showing the directions in which its component parts are movable; and FIG. 5 is an exploded, perspective view of FIG. 4.

DETAILED DESCRIPTION OF THE PREFERRED EMBODIMENT

Figure 1:
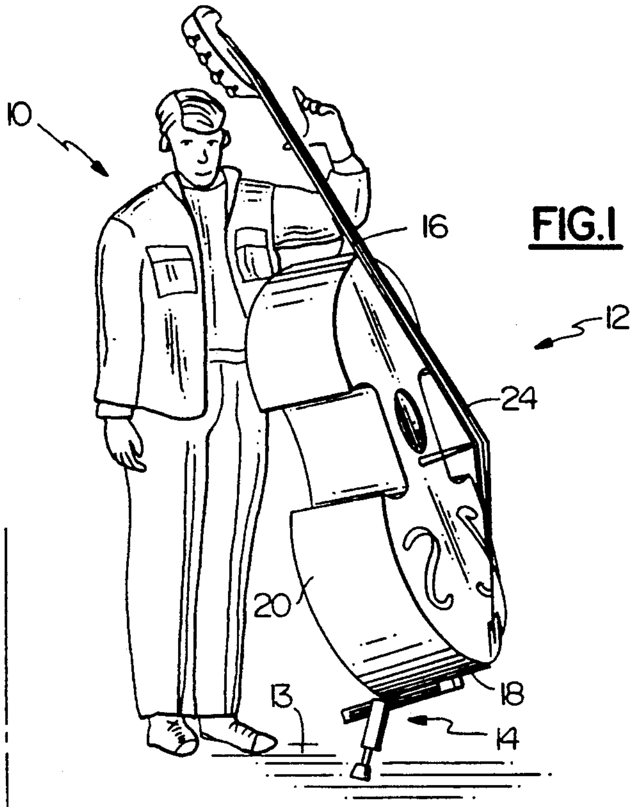
FIG. 1 is a perspective view showing the support assembly attached to and supporting a bass violin with a musician shown balancing the instrument with his left thumb.

Referring now to the drawing figures, there is seen in FIG. 1 a musician 10 holding a conventional bass violin 12. Bass violin 12 is supported in spaced relation above the floor surface 13 by the selectively adjustable support assembly, generally denoted by reference numeral 14. Due to the positioning of the various elements of support assembly 14 (discussed in detail hereinafter), it is seen that musician 10 needs to exert very little force to the neck 16 of bass violin 12 to support and balance bass violin 12.

Figure 2:
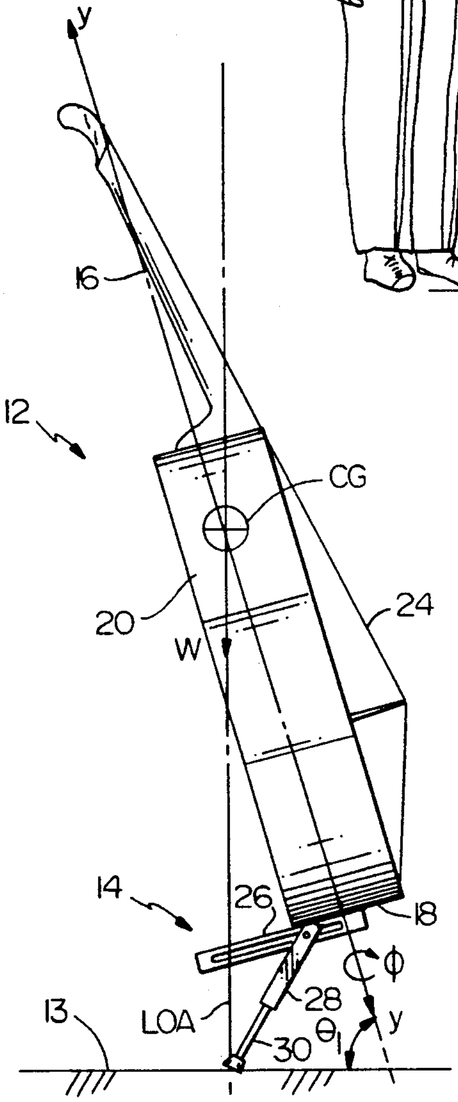
FIG. 2 is a side, elevational view showing the instrument of FIG. 1 supported by the support assembly in a first position.
Figure 3:
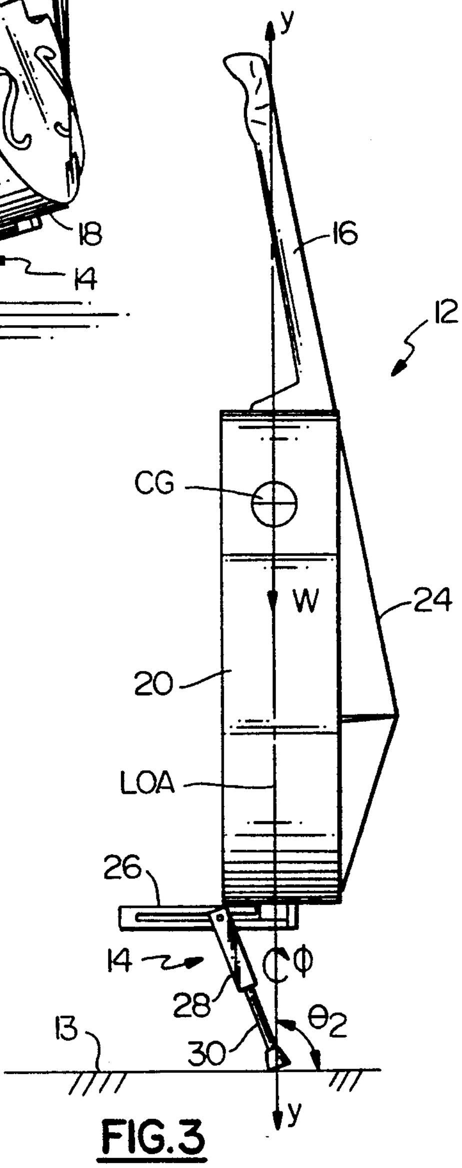
FIG. 3 is a side, elevational view showing the instrument of FIGS. 1 and 2 supported by the support assembly in a second position.

As seen in FIGS. 2 and 3, bass violin 12 has a longitudinal axis y—y which extends centrally from the bottom 18 of the body of bass violin 12, upwardly through the CG of bass violin 12 (the CG illustrated by crosshairs) and completely through the body 20 of bass violin 12.

Typically, when playing a standing musical instrument such as bass violin 12, musician 10 will tilt bass violin 12 towards himself to allow for easier access to the strings 24, thus placing axis y—y at an acute angle $\Theta_1$ (FIG. 2) with respect to floor surface 13 (this angle is typically termed the "pitch angle" of bass violin 12). The tilting of bass violin 12 creates a tilting moment in a direction towards musician 10 (FIG. 1). The magnitude of this moment will be equivalent to the product of some component of the weight of bass violin 12 (shown as the vector W in FIGS. 2 and 3) and the lateral distance between the point where bass violin 12 engages floor 13 and the point where the line of action (LOA) due to W intersects floor 13.

Depending on the pitch angle, musician 10 will adjust the individual components of support assembly 14 so that endpin 30 engages floor 13 in a position which is coincident with the line of action due to W (i.e., the line running perpendicular to the floor through the CG of bass violin 12), as seen in FIGS. 2 and 3, and thus the tilting moment will be zero. This will typically be accomplished by the sensory perception of musician 10. With any of the known prior art support means, musician 10 would have to provide a force on neck 16 of a tilted bass violin 12 to counteract the tilting moment thereof. It is further noted that musician 10 may also rotate crossbar 26 about knob 31 and bass violin 12 some degree $\phi$ (bank angle) about axis y—y which will also add to the tilting moment. Selective rotation is effected by loosening clamp 33 enough to rotate clamp 33 (and crossbar 26) about knob 31 and then re-tightening clamp 33. The contribution of $\phi$ to the tilting moment, unless drastic, will be very negligible.

Attention is now turned to FIGS. 4 and 5 wherein support assembly 14 is seen to generally comprise three elements, namely, crossbar 26, endpin holder 28 and endpin 30. Crossbar 26 rotatably engages a knob 31 on the bottom 18 of bass violin 12 to connect support assembly 14 to instrument 12. Endpin holder 28 pivotally and slidably engages crossbar 26 thereby allowing for experimentation of playing techniques and tilt angles while not making it any more difficult for musician 10 to support and balance bass violin 12. Endpin 30 telescopically and slidably engage endpin holder 28 to allow limited selective adjustment of the overall height of bass violin 12.

More specifically, crossbar 26 includes an elongated shank portion 32 having one end thereof terminating in a clamping member 34. Shank portion 32 is of rectilinear configuration and further includes a longitudinally extending slot 36 which extends almost the entire length thereof. Clamp member 34 is a conventional circumferential clamp which includes a circular opening 40 which has a radial axis r—r extending substantially perpendicular to the longitudinal axis l—l of crossbar 26. Opening 40 rotatably engages clamp 34 to knob 31 as indicated by arrow 43, thus allowing support assembly 14 to extend at any position about a 360° radius with respect to bass violin 12. Clamp 34 further includes a transversely extending slit opening 46 at the end opposite shank portion 32, which substantially separates clamp 34 into two symmetric halves 33 and 35. Slit opening 46 allows the diameter of opening 40 to be adjusted, thus allowing support assembly 14 to be mounted to instruments having knobs of different diameters. To removably secure clamp 34 to knob 31, two axially aligned threaded apertures 48 are formed laterally through halves 33 and 35 of clamp 34 (only one aperture 48 seen in half 35 in FIG. 5). Apertures 48 lead through slit opening 46 and are adapted to receive a cap screw 52 which may be selectively tightened or loosened therein to decrease and increase the size of slit opening 46 and thus the diameter of opening 40, respectively. Although clamp member 34 is shown and described as being a circumferential clamp, any other equivalent type of clamp would suffice.

Endpin holder 28 is also seen to comprise an elongated shank 54 including first and second prongs 56 and 58 integrally and linearly extending from one end thereof. A longitudinally extending bore 59 is formed in the opposite end thereof terminating slightly below the bottom wall of channel 61 formed between prongs 56 and 58. Prongs 56 and 58 include laterally extending, axially aligned apertures 62 and 64, respectively, wherethrough a cap screw 66 extends to attach endpin holder 28 to crossbar 26. More specifically, prongs 56 and 58 are positioned to straddle opposite sides of crossbar 26 with apertures 62 and 64 aligned with slot 36 as seen in FIG. 4. Screw 66 is then passed through to engage apertures 62 and 64 whereby endpin holder 28 may pivot about an axis extending longitudinally through screw 66, and slide longitudinally along crossbar 26 within slot 36, in accordance with the directional arrows in FIG. 4. Endpin holder 28 may thus be moved to the desired position upon crossbar 26 and remain in fixed relation thereto by tightening screw 66 which presses prongs 56 and 58 toward each other to frictionally engage opposite sides of cross bar shank 32.

Referring to FIG. 5, endpin 30 is elongated and includes a rubber stopper 65 at a first end thereof with the second end 67 thereof inserted within bore 59 of endpin holder 28. A set screw 68 passes through an aperture 70 formed in endpin holder 28 adjacent the end opposite prongs 56 and 58. Aperture 70 extends through to bore 59 whereby set screw 68 may be tightened to engage endpin 30 within bore 59 at the desired position. As indicated by the arrow in FIG. 4, endpin 30 may thus be selectively positioned in endpin holder 28 to a variety of depths, thus allowing musician 10 to control the overall height of bass violin 12 to a limited degree. It may thus be appreciated that since endpin holder 28 is both pivotally and laterally adjustable with respect to crossbar 26, endpin 30 will always by capable of engaging floor 13 at the precise point of intersection with the line of action (LOA) extending from weight force vector W, thus eliminating any moment due to the tilting of the instrument.

What is claimed is:

1. A selectively adjustable support assembly for a musical instrument which rests upon the floor when being played, said instrument including a longitudinal axis extending through a body portion having a bottom wall including an anchoring element substantially centrally positioned thereon, said support assembly comprising:

a) an elongated, rigid crossbar having a longitudinal axis and first and second opposite ends, said crossbar including means at said first end thereof adapted to removably attach said crossbar to said anchoring element on said instrument with said crossbar longitudinal axis extending substantially perpendicular to said instrument longitudinal axis;

b) an elongated endpin holder having first and second ends, and including means pivotally connecting said endpin holder first end to said crossbar between said crossbar first and second ends, said endpin holder further including a longitudinally elongated endpin having first and second ends, said endpin first end attached to said endpin holder second end and extending colinearly outwardly from said second end thereof, said endpin second end adapted to frictionally engage said floor with said support assembly thereby raising and supporting said instrument above said floor.

2. The invention according to claim 1 and further comprising means removably attaching said endpin holder first end to said crossbar.

3. The invention according to claim 1 wherein said endpin holder further includes a longitudinally extending bore in said second end thereof wherein said endpin first end is telescopically and slidingly positioned, and further comprising means selectively positioning said endpin's first end within said endpin holder bore.

4. The invention according to claim 3 wherein said selective positioning means comprises:

a.) an aperture formed laterally through said endpin holder to said bore adjacent said second end thereof; and b.) a set screw inserted through said aperture frictionally engaging and holding said first end of said endpin in said endpin holder bore at said selective position.

5. The invention according to claim 2 and further comprising means slidably attaching said endpin holder first end to said crossbar whereby said endpin holder first end may be selectively positioned along the longitudinal length of said crossbar.

6. The invention according to claim 5 wherein said means pivotally and slidably attaching said endpin holder first end to said crossbar comprises:

a) a slot longitudinally extending along said crossbar between said first and second ends thereof and extending entirely therethrough;

b) first and second prongs integrally extending in spaced, parallel relation from said endpin holder first end, said first and second prongs positioned in straddling relationship about said crossbar, said first and second prongs including first and second apertures, respectively, extending laterally therethrough, said first and second apertures axially aligned with each other through said slot; and c) an adjustable screw extending consecutively through said first aperture, said slot, and said second aperture, whereby tightening of said screw is operable to frictionally engage said first and second prongs with said crossbar.

7. The invention according to claim 6 wherein said anchoring element is a round knob and said longitudinal axis of said musical instrument extends through said knob, and said means removably attaching said crossbar to said anchoring element comprises a circumferential clamp integrally formed at said crossbar first end, said clamp having an adjustable, circular clamp opening into which said knob is positioned with said clamp being frictionally engagable therewith, whereby said crossbar is selectively pivotal about said knob and said longitudinal axis.

8. The invention according to claim 7 wherein said clamp includes a transversely extending slit opening dividing said clamp into symmetrical first and second halves, said halves including aligned first and second, threaded apertures wherethrough a screw is passed to selectively adjust the diameter of said clamp circular opening.

9. The invention according to claim 8 wherein said endpin holder further includes a longitudinally extending bore in said second end thereof and wherein said endpin first end is telescopically and slidingly positioned and further including means to selectively position said endpin first end within said bore.

10. The invention according to claim 9 wherein said selective positioning means comprises an aperture formed laterally through said endpin holder to said bore adjacent said second end thereof and wherethrough a set screw is passed to frictionally engage and hold said endpin first end in said endpin holder bore at said selective position.

* * * * *